United States Patent Office 3,631,122
Patented Dec. 28, 1971

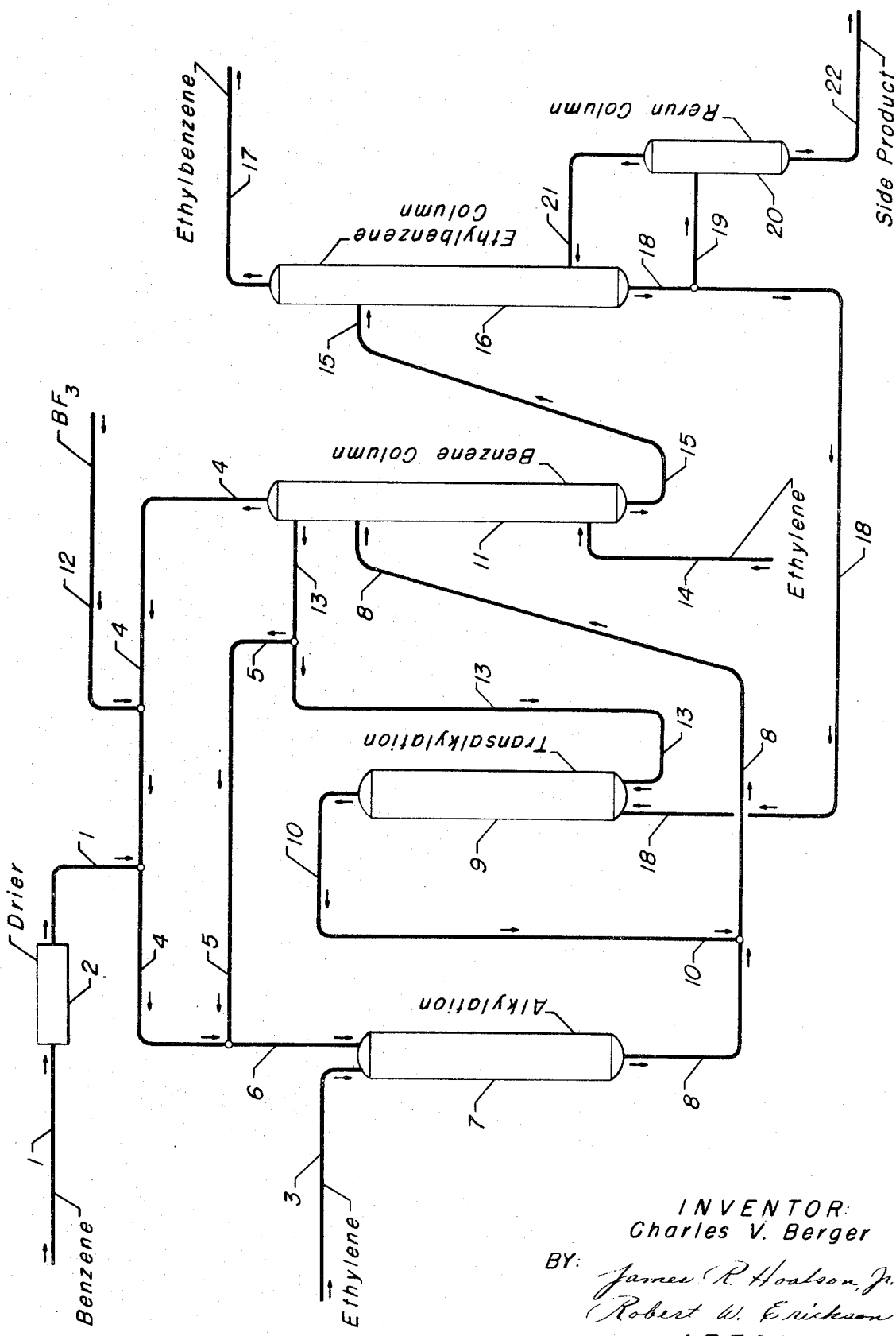

3,631,122
ALKYLATION PROCESS
Charles V. Berger, Western Springs, Ill., assignor to Universal Oil Products Company, Des Plaines, Ill.
Filed Feb. 24, 1970, Ser. No. 13,632
Int. Cl. C07c 3/56
U.S. Cl. 260—671                    14 Claims

ABSTRACT OF THE DISCLOSURE

Non-volatile boron oxide hydrates produced during the alkylation of an alkylatable aromatic hydrocarbon with an olefin-acting compound in the presence of a boron halide and a boron halide modified inorganic oxide are removed by reacting the boron oxide hydrate with an olefin-acting compound and removing the resultant reaction product.

BACKGROUND OF THE INVENTION

This invention pertains to a process for the production of alkylaromatic hydrocarbons. Specifically, this invention relates to a process for the alkylation of an alkylatable aromatic hydrocarbon with an olefin-acting compound and in particular, the alkylation of benzene with ethylene to form ethylbenzene. More specifically this invention relates to an alkylation process catalyzed by a boron halide wherein undesired boron oxide hydrates formed therein are efficiently removed.

Processes for the production of alkylaromatic hydrocarbons have acquired significant importance in the petroleum and petrochemical industries as starting materials in the manufacture of resins, plastics, detergents, elastomers, etc. For example alkylation of benzene with ethylene to form ethylbenzene is important in the overall production of styrene, a synthetic rubber constituent. Likewise, the alkylation of benzene with propylene to form cumene is important in the overall production of phenol and acetone.

One of the more commercially significant processes for the alkylation of benzene and other alkylatable aromatic hydrocarbons, involves the alkylation of an alkylatable aromatic hydrocarbon with an olefin-acting compound in the presence of a boron halide such as boron trifluoride and a boron halide modified substantially anhydrous, inorganic oxide such alumina. In this type of alkylation process, an anhydrous method of operation is preferred to prevent catalyst deactivation. Thus, all of the feedstocks passed to the system are dried to maintain an anhydrous alkylation reaction environment. However, as a practical matter, completely anhydrous streams are never achieved and a minute amount of water inevitably enters the alkylation reaction environment. As a result there is formed, in this alkylation reaction environment, a reaction product of water and boron halide comprising relatively non-volatile hydrates of boron oxides, which appear in small amounts (i.e. 0.02 to about 50 weight p.p.m. (expressed as elemental boron) in the alkylation reaction effluent, typically in a dissolved and/or suspended state. This effluent, in a typical alkylation process, is then passed to a fractional distillation system where, in a first distillation column, boron halide and unreacted aromatic hydrocarbon are removed overhead and alkylation products are removed as bottoms for further recovery and/or processing. In this first distillation column, the relatively non-volatile boron oxide hydrates precipitate out and form insoluble deposits inside the distillation column and attendant reboiler which gradually accumulate therein, hampering efficient operation of the column.

One method utilized by the prior art to control this deposit formation is to pass a relatively pure boron halide stream to the lower portion of this first distillation column. This volatile halide then forms a volatile complex with the non-volatile boron oxide hydrates and the resultant complex is continuously withdrawn as dissolved matter in the aromatic hydrocarbon withdrawn from this distillation column for recycle to the alkylation reaction. The boron oxide hydrates in this stream are then removed from this stream by contacting with an alumina adsorbent which selectively adsorbs and removes the boron oxides therefrom and produces a relatively pure recycle stream.

The alumina utilized therein, however, has a low adsorption capacity, often limited to about 10 weight percent of the fresh alumina charge and, further, the spent alumina is non-regenerable. This becomes economically important as the availability of suitable alumina diminishes and the cost of the same accordingly increases. Of further significance is that the volatilization of these boric oxide hydrates at the outset requires the addition of additional amounts of boron halide to the entire process for efficient removal of these oxides from the aforedescribed distillation column.

SUMMARY OF THE INVENTION

Accordingly, it is an object of the present invention to provide a process for the alkylation of an alkylatable aromatic hydrocarbon with an olefin-acting compound utilizing a boron halide and a boron halide modified substantially anhydrous inorganic oxide catalyst wherein any undesired boron oxide hydrates formed therein are efficiently and economically removed. It is a correlate object of the process of the present invention to provide a method for removing boron oxide hydrates formed in a boron halide catalyzed, aromatic hydrocarbon alkylation process in an efficient, effective manner.

In an embodiment therefor, this invention provides an improvement in a process for the alkylation of an alkylatable aromatic hydrocarbon with an olefin-acting compound in an alkylation zone at alkylation conditions in the presence of undesired minute quantities of water which comprises contacting, in admixture with a boron halide said hydrocarbon and said olefin-acting compound with a boron halide modified substantially anhydrous inorganic oxide to produce an alkylation zone effluent comprising boron halide, unreacted hydrocarbon and alkylation products of said hydrocarbon and said olefin-acting compound, wherein said unreacted hydrocarbon from said effluent is separated by fractional distillation in a distillation zone for recycle to said alkylation zone in which process there is formed an undesired reaction product of water and boron halide, said product comprising relatively non-volatile hydrates of boron oxides, which product is contained in said alkylation zone effluent and may be deposited in said distillation zone, the improvement which comprises reacting said undesirable boron oxide hydrates contained in said effluent with an olefin-acting compound to form a hydrocarbon soluble complex thereof and thereafter removing said complex from said process, whereby the deposition of said boron oxide hydrates in said distillation zone is eliminated. The first named and second named olefin-acting compound may or may not be the same but it is preferred that they are.

In a further embodiment the present invention relates to a process for the alkylation of an alkylatable aromatic hydrocarbon in the presence of minute amounts of water. This process comprises first contacting said hydrocarbon, an olefin-acting compound, and a boron halide with a boron halide modified substantially anhydrous inorganic oxide, at alkylation conditions in an alkylation zone to produce an alkylation zone effluent comprising unreacted alkylatable hydrocarbon, alkylation products of said hydrocarbon and said olefin-acting compound and a reaction of water and boron halide said product comprising relatively non-volatile hydrates of boron oxides. This effluent is then passed to a fractional distillataion column having both an upper enriching section and a lower exhausting section. In this distillation column the unreacted alkylatable aromatic hydrocarbon is separated and removed therefrom by withdrawal from said upper enriching section. In the lower exhausting section of this distillation column an olefin-acting compound is admixed to produce an exhaustion section effluent comprising akylation products formed in the alkylation zone and a hydrocarbon soluble complex formed between said non-volatile borates and said olefin-acting compound in this distillation column. This effluent is withdrawn, and separated therefrom are alkylation products formed between said aromatic hydrocarbon and said olefin-acting compound as produced in the alkylation zone and the boron oxide-olefin-acting compound complex formed in the distillataion column.

In further more limited embodiments the boron halide utilized is boron trifluoride, the inorganic oxide utilized is alumina, the alkylatable aromatic is benzene and the olefin-acting compound is ethylene. Other objects and embodiments referring to alternative alkylatable aromatic hydrocarbons and olefin-acting compounds as well as specific alkylation conditions will be found in the following more detailed description of the present invention.

In summary therefore, this invention resides in an effective, economical method for removing boron oxide hydrates from a boron halide catalyzed alkylation zone effluent by reacting said oxides with an olefin-acting compound and separating the resultant reaction product therefrom. This separation can be effectively performed by fractional distillation.

DESCRIPTION OF PREFERRED EMBODIMENTS

The alkylatable aromatic hydrocarbons suitable for use in the process of the present invention are many, the monocyclic aromatic hydrocarbons, particularly benzene being preferred. In addition to benzene, other suitable alkylatable monocyclic aromatic hydrocarbons include toluene, orthoxylene, meta-xylene, para-xylene, ethylbenzene, ortho-ethyl toluene, meta-ethyltoluene, para-ethyltoluene, 1,2,3-trimethylbenzene, 1,2,4-trimethylbenzene, 1,3,5-trimethylbenzene, normal propylbenzene, isopropylbenzene (cumene), normal butylbenzene, etc. Higher molecular weight alkyl aromatic hydrocarbons are also suitable as alkylatable hydrocarbons and include aromatic hydrocarbons such as are produced by the alkylation of aromatic hydrocarbon with olefin polymers. Such hydrocarbons are frequently referred to in the art as alkylate, and include hexylbenzenes, nonylbenzenes, dodecylbenzenes, pentadecylbenzenes, hexyltoluenes, dodecyltoluenes, pentadecyltoluenes, etc. Other suitable alkylatable aromatic hydrocarbons include those aromatics with 2 or more aryl groups present such as diphenyl, diphenylmethane, triphenyl, triphenylmethane, fluorene, stilbene, etc. Also within the scope of the present invention are condensed aromatic hydrocarbons including naphthalene, alkyl naphthalenes, anthracenes phenanthrene, etc. However, whenever utilizing these higher molecular weight aromatic compounds it is imperative that they not be in a solid state when passed to the hereinafter described alkylation zone.

The olefin-acting compounds suitable for utilizataion in the process of the present invention may be selected from diverse materials including mono-olefins, di-olefins, polyolefins, acetylenic hydrocarbons, alcohols, ethers, alkyl halides alkyl sulfates, alkyl phosphates, and the various esters of the carboxylic acids. The preferred olefin-acting compounds for use in the process of the present invention are olefinic hydrocarbons including the mono-olefins containing one double bond per molecule as well as polyolefins which contain more than one double bond per molecule. Mono-olefins which may be utilized as olefin-acting compounds are normally gaseous or normally liquid in form and include ethylene, propylene, 1-butene, 2-butene, isobutylene, as well as the higher molecular weight normally liquid olefins such as the various pentenes, hexenes, heptenes, octenes, etc., and various mixtures thereof. Also suitable are the still higher molecular weight liquid olefins including the various olefin polymer having from about 9 to about 18 carbon atoms per molecule including propylene trimer, propylene tetramer, propylene pentamer, etc. Cyclo-olefins such as cyclopentene, methylcyclopentene, methylcyclohexene, cyclohexene, etc., are also included within the scope of the present invention. Also included as olefin-acting compound are certain compounds capable of producing olefin hydrocarbons or intermediates thereof under the conditions typically utilized in the alkylation reaction. Typical olefin producing substances or olefin-acting compounds capable of utilizataion in the process of the present invention include the alkyl halides containing at least two carbon atoms per molecule such as ethyl fluoride, normal propyl fluoride, isopropyl fluoride, normal butyl fluoride, isobutyl fluoride, secondary-butyl fluoride, tertiary-butyl fluoride, etc., as well as the corresponding chlorides, bromides, and iodides of the foregoing illustrated compounds. Also suitable are alkyl sulfates including ethyl sulfate, propyl sulfate, etc., and the alkyl phosphates including ethyl phosphate, propyl sulfate, etc. Ethers, such as diethyl ether, ethyl propyl ether, dipropyl ether, etc., are also included within a generally broad scope of the term "olefin acting compound" and may be successfully utilized to alkylate aromatic hydrocarbons according to the process of the present invention.

Particularly preferred for utilization in the process of the present invention are the normally gaseous $C_2$–$C_4$ mono-olefins, and in particular, ethylene. Further the process of this invention may be successfully applied to, and utilized for, complete conversion of olefin hydrocarbons when these olefin hydrocarbons are present in minor quantities in various hydrocarbon gas streams. Thus, the normally gaseous mono-olefins, such as ethylene when utilized in the process of the present invention need not be concentrated. Such normally gaseous olefin hydrocarbons appear in minor quantities in various re-refinery gas streams usually diluted with gases such as hydrogen, nitrogen, methane, ethane, propane, etc. These streams are obtained from refinery installations including thermal cracking units, catalytic cracking units, thermal reforming units, coking units polymerization units, dehydrogenation units and the like. A typical refinery off-gas ethylene stream usually contains varying quantities of hydrogen, nitrogen, methane and ethane with the ethylene usually being present in minor proportions. A refinery off-gas propylene stream thus contains propylene in minor quantities diluted with propane and likewise, a refinery off-gas butene stream is normally diluted with butanes and contains the butenes in minor quantities. These gas streams containing olefin hydrocarbons in minor, dilute quantities are particularly suitable for use within the board scope of this invention. It is readily apparent that only the olefin content of these streams undergoes reaction at the alkylation conditions of the process and that the remaining gases, free from olefin hydrocarbons, are readily vented in the process. Particularly preferred is the alkylation of benzene with ethylene to form ethylbenzene.

The alkylation reaction between the alkylatable aromatic hydrocarbon and the olefin-acting compound is to be effected by the utilization of a boron halide modified, substantially anhydrous inorganic oxide. This type of alkylation catalyst is well known to those trained in the art and usually consists of boron trifluoride as the boron halide. Therefore, whenever, the term boron trifluoride is used herein, it likewise includes the corresponding chlorides and bromides although boron trifluoride is the preferred boron halide. The inorganic oxide of this catalyst may be selected from among the diverse inorganic oxides including alumina, silica, boria, oxides of phosphorus, titanium dioxide, zirconium dioxide, chromia, zinc oxide, magnesia, calcium oxide, silica-alumina, silica-magnesia, silica-alumina-magnesia, silica-alumina zirconia, chromia-alumina, alumina-boria, silica-zirconia, etc. and the various naturally occurring inorganic oxides of various state of purity such as bauxite, clay, diatomaceous earth, etc. Of the above mentioned inorganic oxides, gamma-alumina and theta-alumina are most readily modified by boron trifluoride and thus, the use of one or both of these boron trifluoride modified aluminas is preferred. The modification of the inorganic oxide, particularly alumina, may be carried out prior to, or simultaneously with, the passage of the aromatic and olefin-acting reactants containing boron trifluoride to the catalyst. The exact manner in which the inorganic oxides are modified by boron trifluoride is not completely understood but it has been found that the modification is preferably carried out at a temperature at least as high as that selected for use during the alkylation so that the catalyst will not exhibit an activity induction period. If the inorganic oxide such as alumina is modified prior to use in the alkylation reaction, the modification may be carried out either in situ in the alkylation reactor or in a separate catalyst preparation step. More simply this modification is accomplished by mere passage of boron trifluoride gas over the inorganic oxide which is maintained at the desired alkylation temperature as will be hereinafter described. If the modification of the inorganic oxide with boron trifluoride is carried out during the passage of the reactants over the catalyst, the catalyst will exhibit an induction period and thus complete reaction of the alkylatable aromatic hydrocarbon and olefin-acting compound will not effectively take place for some period of time of often up to 12 hours or more.

The alkylation of the alkylatable hydrocarbons and the olefin-acting compound is effected by contacting an aromatic hydrocarbon, an olefin-acting compound, and a boron halide, preferably boron trifluoride with the hereinbefore described boron halide modified substantially anhydrous inorganic oxide catalyst, at alkylation conditions in an alkylation zone. The preferred boron halide, boron trifluoride, is a gaseous material boiling at $-101°$ C. and is somewhat soluble in most organic solvents. It is generally utilized as a pure gaseous material by mere passage of the gas to the alkylation zone so that it dissolves, at least partially, in the alkylatable aromatic compound. The boron trifluoride may also be added as a solution of a gas in a suitable organic solvent. However, in the utilization of such solutions, care must be exercised so that selective solvent does not react with the alkylatable aromatic or the olefin-acting compound. Furthermore, boron trifluoride complexes with many organic compounds, particularly those containing sulfur or oxygen atoms. These complexes, while they may be utilized as a catalyst, are very stable and will interfere with the recovery of the boron trifluoride after the completion of the alkylation reaction so that the boron trifluoride may not be efficiently recovered and recycled to the alkylation zone. Thus if a solvent is used it is preferred that it be free from atoms or groups which form complexes with boron trifluoride.

The amount of boron trifluoride which is required to effect the alkylation reaction is relatively small and this amount can be conveniently expressed in the terms of grams of boron trifluoride per mole of olefin-acting compound. This amount of boron trifluoride may be less than about 1 gram of boron trifluoride per gram mole of olefin utilized and preferably may be from about .01 to about 1.0 gram of boron trifluoride per gram mole of olefin. When this amount of boron trifluoride is present in the alkylation zone substantially complete conversion of the olefin-acting compound is obtained even when the olefin-acting compound is present in what might seem to be minor or dilute quantities in a refinery gas stream. Further, as known to the art, it is preferred to utilize a molar excess of alkylatable aromatic compound over olefin-acting compound to prevent side reactions from taking place, such as the polymerization of the olefin-acting compound, prior to its reaction with the alkylatable aromatic hydrocarbon and to further direct the alkylation reaction principally to a mono-alkylated product. A molar excess of alkylatable aromaitc hydrocarbon may be utilized, although best results are obtained when the alkylatable aromatic hydrocarbon to olefin-acting compound mole ratio is from about 2:1 to about 20:1, with any unreacted aromatic compound being recovered and recycled to the alkylation zone.

The conditions utilized in the alkylation reaction zone may be varied over a wide range within the knowledge of those skilled in the art. The desired alkylation reaction may be effected by contacting the identified reactants and catalyst at a temperature of about 0° C. to about 300° C., preferably about 100° C. to about 250° C., and at a pressure of about atmospheric to about 200 atmospheres or more, preferably about 15 to about 150 atmospheres. In any event the pressure should be selected to maintain the alkylatable aromatic hydrocarbon in substantially the liquid phase. However, within the above mentioned temperature and pressure ranges, it is not always possible to maintain the olefin-acting compound, particularly the light gaseous olefins such as ethylene, in the gaseous phase. When utilizing such a gaseous olefin such as ethylene, the ethylene will be dissolved in the alkylatable aromatic and the formed alkylate product to the extent permitted by solubility and thermodynamic considerations. Thus, at the outset of the alkylation reaction, at least a portion of the ethylene will be in the gaseous phase. The liquid hourly space velocity of the liquid passed to the alkylation zone may vary from about 0.1 hr.$^{-1}$ to about 20 hr.$^{-1}$. The above conditions, in any event, are to be appropriately adjusted to insure essentially 100% conversion of the olefin-acting compound.

The effluent produced in the alkylation zone contains boron halide, excess unreacted alkylatable aromatic hydrocarbon, and alkylation products of the hydrocarbon and the olefin-acting compound. These alkylation products are mostly, in the preferred case, mono-alkylated species with smaller proportions of polyalkylated species. For example, in the alkylation of benzene and ethylene, ethylbenzene is primarily formed along with smaller amounts of di- tri-, etc. ethylbenzenes. These polyethylbenzenes, however, are readily recoverable and then converted to ethylbenzene by contacting these polyethylbenzenes with benzene in a separate transalkylation zone utilizing essentially the same catalyst and reaction conditions as hereinbefore described for the alkylation zone. The operation and function of this transalkylation zone are within the general knowledge of those trained in the art and since it is not essential to the present invention does not neeed further explanation herein. Also contained in the alkylation zone effluent are high boiling products formed by condensation of the alkylatable aromatic. For example, in benzene alkylation, diphenyl compounds are formed.

Also formed in the alkylation zone effluent because of the presence of minute amounts (0.01 to 25 weight p.p.m.) of water are materials, which, if not removed, will form deposits in distillation columns and reboilers. These materials typically consist of compounds of boron, fluorine or oxygen and usually have a fluorine to boron atomic ratio of less than 3.0. These compounds of boron are predominately oxides of boron such as boron trioxide and the various non-volatile hydrates of boron oxides such as orthoboric acid, tetraboric acid, metaboric acid etc. In addition, there are present coordination compounds comprising boron, hydrogen, oxygen and fluorine. While not to be limited thereby, these compounds appear to exist as $B(OH)_2F$, $B(OH)F_2$, etc., and are characterized by a fluorine to boron mole ratio of less than 3.0. These mentioned boron compounds are encountered in combination with each other as well as singly and it is to be appreciated by those trained in the art that the foregoing compounds do not exhaust the number of boron compounds which can form deposits in process equipment and which are formed in the described alkylation reaction environment. Hence, these compounds are exemplary and not limiting on the broad scope of this invention. While the amount of these deposit forming materials present in the alkylation zone effluent depend to a great extent on the amount of undesired water present in the alkylation environment, in an alkylation reaction, as previously described, wherein about 0.01 to about 25 p.p.m. by weight is unavoidably added thereto, the resultant effluent will typically contain these deposit forming materials in an amount of about 0.02 to about 50 p.p.m. weight boron, expressed as an elemental basis. While these amounts appear small, unless removed in some manner as hereinbefore described, these boron hydrates etc., will ultimately form deposits in subsequent processing equipment. According to the process of the present invention, these deposit forming materials can be effectively removed from the alkylation zone effluent whereby this deposition, in subsequent processing and distillation equipment, is eliminated. This removal is effected by reacting the boron oxide hydrates and like materials with an olefin-acting compound of the same type as hereinbefore described as suitable for alkylating the alkylatable aromatic hydrocarbon. Formed as a result of this reaction is a complex, appearing to be an alkyl borate, which does not form solid deposits in latter processing equipment and may be ultimately removed by fractional distillation techniques. This complex is not formed in appreciable quantities in the alkylation zone environment, possibly because of the presence of the boron halide modified inorganic oxide catalyst which seems to direct the olefin-acting compound to predominately an alkylation reaction. Thus, the reaction between the olefin-acting compound and the boron oxide hydrates and the like may be effected by admixing the olefin-acting compound preferably in a mole excess relative to the hydrates, with the alkylation zone effluent. Often the olefin-acting compound to be utilized is the same compound as used to effect the alkylation reaction to insure overall product purity in the process to the extent any of the added olefin-acting compound does undergo alkylation with the aromatics present. However, it is within the scope of the present invention to include processes wherein such compounds differ. For example, in the alkylation of benzene with ethylene, ethylene is preferred in forming the complex with the boron compounds but it is also within the scope of this invention to utilize another olefin especially an easily separable higher olefin such as dodecene, to effect the complex formation.

This complex formation may be effected at temperatures of from about 50° C., to about 225° C., and pressures from about atmospheric to about 150 atmospheres. In general, however, the environment present in the alkylation reaction effluent either before or after cooling is sufficient. A mole excess of olefin to boron compound is desired for an effective reaction. Particularly suitable are ratios of 1:1 to about 100:1.

The preferred method of effecting this complex formation is to perform the reaction in the distillation column where the alkylation reaction effluent is first separated. Specifically, it is the distillation column, wherein the unreacted aromatic hydrocarbon and boron halide are separated for recycle, from the alkylation products. This distillation column contains an upper enriching section wherein the lower boiling, unreacted alkylatable aromatic hydrocarbon and boron halide are separated and withdrawn, and a lower exhausting section (including reboiler) wherein the higher boiling alkylation products of the alkylation reaction are separated and withdrawn. The reaction between the boron oxide hydrates and the like is then effected by admixing, in the lower exhausting section, an olefin-acting compound, and preferably a normally gaseous mono-olefin as utilized in the alkylation step. The environment of the distillation column necessary to separate the alkylation effluent suffices to permit the complex formation, namely a temperature of about 100° C. to about 200° C. and a pressure of about 5 p.s.i.g. to about 25 p.s.i.g. By performing the reaction in this manner, a more efficient reaction is obtained since the concentration of these boron compounds is the greatest at this place in the column. While varying amounts of olefin-acting compound may be utilized to effect this complex formation, it is preferred to use a substantial mole excess of olefin-acting compound per mole of boron oxide hydrates and the like to be removed. In general, it is convenient to refer to the amount added in terms of the amount of alkylation zone effluent passed to the distillation column. For typical alkylation zone effluent containing about 0.02 to about 50 p.p.m. by weight boron compounds (based on elemental boron content) of the described deposit forming nature, about 0.02 mole to about 5,000 moles of olefin-acting compound per million moles of alkylation zone effluent is passed to the described lower exhausting section. In any event, the formed complex is withdrawn from the exhaustion zone effluent (or bottoms) of the distillation column in admixture with the alkylation products of the alkylation reaction. This complex is readily removed by convention methods, such as fractional distillation, thereby preventing accumulation in a typical recycle process producing monoalkylated aromatics where the polyalkylated aromatics are recycled to a transalkylation zone to form monoalkylated aromatics or to prevent contamination of the desired alkylated product.

DRAWING DESCRIPTION AND ILLUSTRATIVE EMBODIMENTS

The appended drawing and the following description and illustrative embodiment are presented to further illustrate the practice of the process of the present invention and the benefits attendant to its practice. Miscellaneous appurtenances including valves, pumps, compressors, reboilers, etc. have been eliminated and only those vessels and flows needed for a clear understanding of this invention are included. Modifications made by those trained in the art are deemed inherent in this flow.

With reference to the appended drawing illustrating the production of ethylbenzene via the alkylation of benzene with pure ethylene, feed benzene enters via line 1 is dried by contacting with molecular sieve adsorbents contained in drier 2, admixed with boron trifluoride entering via line 4 and recycle benzene entering via line 5 with the resultant dried benzene-boron trifluoride mixture passed via line 6 to alkylation zone 7. Ethylene, having a minimum purity of 99.95 mole percent enters via line 3, and is passed to alkylation zone 7 wherein it is commingled with the benzene and boron trifluoride to provide a total alkylation zone feed containing a 2:1 benzene to ethylene mole ratio, about .1 gram of boron trifluoride per gram mole of ethylene and, despite the drying facilities, a total water content of about 1 p.p.m. by weight. Alkylation zone 7 contains a conventional boron trifluoride modified substantially anhydrous alumina catalyst. Within this zone the reaction feed is contacted with this catalyst at a liquid hourly space velocity of about 1.5 hr.$^{-1}$ in a down flow manner. This zone is maintained at a temperautre of about 300° F. —400° F. and a pressure of about 425–475 p.s.i.g. The resultant reaction effluent evidences 100% ethylene conversion and contains unreacted benzene, ethylbenzene, polyethylbenzenes, boron trifluoride and boron oxide hydrates and the like compounds of the type as hereinbefore described. This effluent leaving alkylation zone 7 via line 8 is commingled with transalkylation zone 9 effluent, source of which is hereinafter described, entering via line 10 and the resultant mixture is passed via line 8 to benzene column 11. This column typically contains 30–40 actual stages with a reboiler bottoms temperature of about 350–400° F., an overhead temperature of about 200–250° F. and a column pressure of about 10–30 p.s.i.g. From the upper enriching section of column 11 boron trifluoride is withdrawn via line 4 and benzene is withdrawn via line 13. At least a portion of the boron trifluoride and benzene are recycled to alkylation zone 7 by lines 4 and 5 respectively. Make-up boron trifluoride enters via line 12 and is commingled with recycle boron trifluoride in line 4. In addition, this recycle stream may be purified by means not shown to separate any light impurities passed to, or produced in the process.

The potentially deposit forming boron compounds present in line 8, the majority of which are produced in alkylation zone 7, with the remainder produced in the hereinafter described transalkylation zone 9, are present, on an elemental boron basis, of about 0.02 to about 50 p.p.m. by weight. If not removed, the compounds will form deposits and foul the reboilers on benzene column 11 and render the column economically inefficient within anywhere from about 1 to about 20 weeks. However, by admixing ethylene entering via line 14 in the lower exhausting section of column 11, preferably in the reboiler proper, a complex is formed within the column and the propensity for deposit formation and reboiler fouling is virtually eliminated. This is effectively accomplished by adding about 10 to about 100 moles of ethylene per million moles of benzene column 11 feed entering via line 8.

The thus formed complex is removed from column 11 in admixture with ethylbenzene and polyethylbenzenes via line 15 and passed thereby to ethylbenzene column 16 wherein ethylbenzene product is separated and removed via line 17. The polyethylbenzenes are withdrawn via line 18 and at least a portion thereof are passed via line 18 and admixed with benzene entering via line 13 in an upflow manner in transalkylation zone 9. This zone contains the same boron trifluoride modified alumina catalyst as utilized in alkylation zone 7 and is maintained at reaction conditions including a liquid hourly space velocity of about 2, a reaction temperature of about 400° F. and a reaction pressure of about 250 p.s.i.g. A transalkylation reaction between the benzene and polyethylbenzenes results to produce ethylbenzene thus insuring essentially 100% conversion of the original benzene and ethylene to ethylbenzene. The resultant effluent is then removed via line 10 and commingled with alkylation zone effluent 8 and passed to benzene column 11 as hereinbefore described.

From ethylbenzene column 16 bottoms, withdrawn via line 18, a portion thereof is removed by line 19 and passed to fractional distillation zone 20, wherein at least a portion of the boron-ethylene complex formed in benzene column 11, in admixture with biphenyl etc., produced in minor quantities in the alkylation and transalkylation zones, is removed via line 22 to prevent accumulation in the total process. The thus purified polyethylbenzenes are withdrawn via line 21 and passed back to ethylbenzene column 16. Thus, because of the ready operability of this invention and the potential deposit formation elimination, it is apparent to the art that a much improved boron halide catalyzed alkylation reaction, particularly for ethylene-benzene alkylation has resulted.

I claim as my invention:

1. In a process for the alkylation of an alkylatable aromatic hydrocarbon with an olefin-acting compound in an alkylation zone at alkylation conditions in the presence of undesired, minute quantities of water which comprises contacting, in admixture with a boron halide, said hydrocarbon and said olefin-acting compound with a boron halide modified substantially anhydrous inorganic oxide to produce an alkylation zone effluent comprising boron halide, unreacted aromatic hydrocarbon and alkylation products of said hydrocarbon and said olefin-acting compound, wherein said unreacted hydrocarbon in said effluent is separated by fractional distillation in a distillation zone for recycle to said alkylation zone and in which process there is formed an undesired reaction product of water and boron halide, said product comprising relatively non-volatile hydrates of boron oxides, and which product is contained in said alkylation zone effluent and may be deposited in said distillation zone, the improvement which comprises reacting said undesired boron oxide hydrates with an olefin-acting compound to form a hydrocarbon soluble complex thereof and thereafter removing said complex from said process whereby the deposition of said boron oxide hydrates in said distillation zone is eliminated.

2. The improvement of claim 1 further characterized in that said olefin acting compound is a $C_2$–$C_4$ mono-olefin.

3. The improvement of claim 1 further characterized in that said complex formation is effected in said distillation zone.

4. The improvement of claim 1 further characterized in that said complex is thereafter removed by fractional distillation techniques.

5. A process for the alkylation of an alkylatable aromatic hydrocarbon in the presence of minute amounts of water which comprises the steps of:
   (a) contacting said hydrocarbon, an olefin-acting compound and a boron halide, with a boron halide modified substantially anhydrous inorganic oxide, at alkylation conditions, in an alkylation zone to produce an alkylation zone effluent comprising unreacted alkylatable aromatic hydrocarbon, alkylation products of said hydrocarbon and said olefin-acting compound, and a reaction product of water and boron halide said product comprising relatively non-volatile hydrates of boron oxides;
   (b) passing said effluent to a fractional distillation column having an upper enriching section and a lower exhausting section;
   (c) separating, in said distillation column said unreacted alkylatable aromatic hydrocarbon and removing said hydrocarbon from said upper enriching section;
   (d) admixing, in said lower exhausting section an olefin-acting compound, to produce an exhaustion section effluent comprising the alkylation products formed in said alkylation zone and a hydrocarbon soluble complex formed between said borate and said olefin-acting compound in said distillation column; and,
   (e) separating from said exhaustion section effluent the alkylation product formed between said aromatic hydrocarbon and said olefin-acting compound as produced in said alkylation zone and at least a portion of said olefin-acting compound-boron oxide complex formed in said distillation column.

6. The process of claim 5 further characterized in that said boron halide is boron trifluoride.

7. The process of claim 5 further characterized in that said inorganic oxide is alumina.

8. The process of claim 5 further characterized in that said aromatic is benzene.

9. The process of claim 5 further characterized in that said olefin-acting compound is a $C_2$–$C_4$ mono-olefin.

10. The process of claim 9 further characterized in that said olefin is ethylene.

11. The process of claim 5 further characterized in that said aromatic is benzene, said olefin acting compound is ethylene, said halide is boron trifluoride and said inorganic oxide is alumina.

12. The process of claim 5 further characterized in that said alkylation conditions include a temperature of about 0° C. to about 300° C., a pressure of about atmospheric to about 200 atmospheres, a liquid hourly space velocity of about 0.1 hr.$^{-1}$ to about 20 hr.$^{-1}$, a mole ratio of aromatic to olefin-acting compound of about 2:1 to about 20:1 and boron trifluoride in an amount of about 0.01 to about 1.0 gram of boron trifluoride per gram mole of olefin-acting compound.

13. The process of claim 5 further characterized in that said olefin acting compound, admixed in said exhausting section in step (d), is admixed in an amount of about 0.02 mole to about 5000 moles of olefin-acting compound per million moles of alkylation zone effluent passed to said distillation system in step (b).

14. The process of claim 5 further characterized in that said olefin-acting compound admixed in step (d) is the same as the olefin-acting compound utilized in step (a).

References Cited

UNITED STATES PATENTS

| | | | |
|---|---|---|---|
| 3,193,591 | 7/1965 | Belden | 260—671 |
| 3,217,054 | 11/1965 | Haensel et al. | 260—671 |
| 3,238,268 | 3/1966 | Fenske | 260—671 |

CURTIS R. DAVIS, Primary Examiner

U.S. Cl. X.R.

260—674 A